Figure 1:
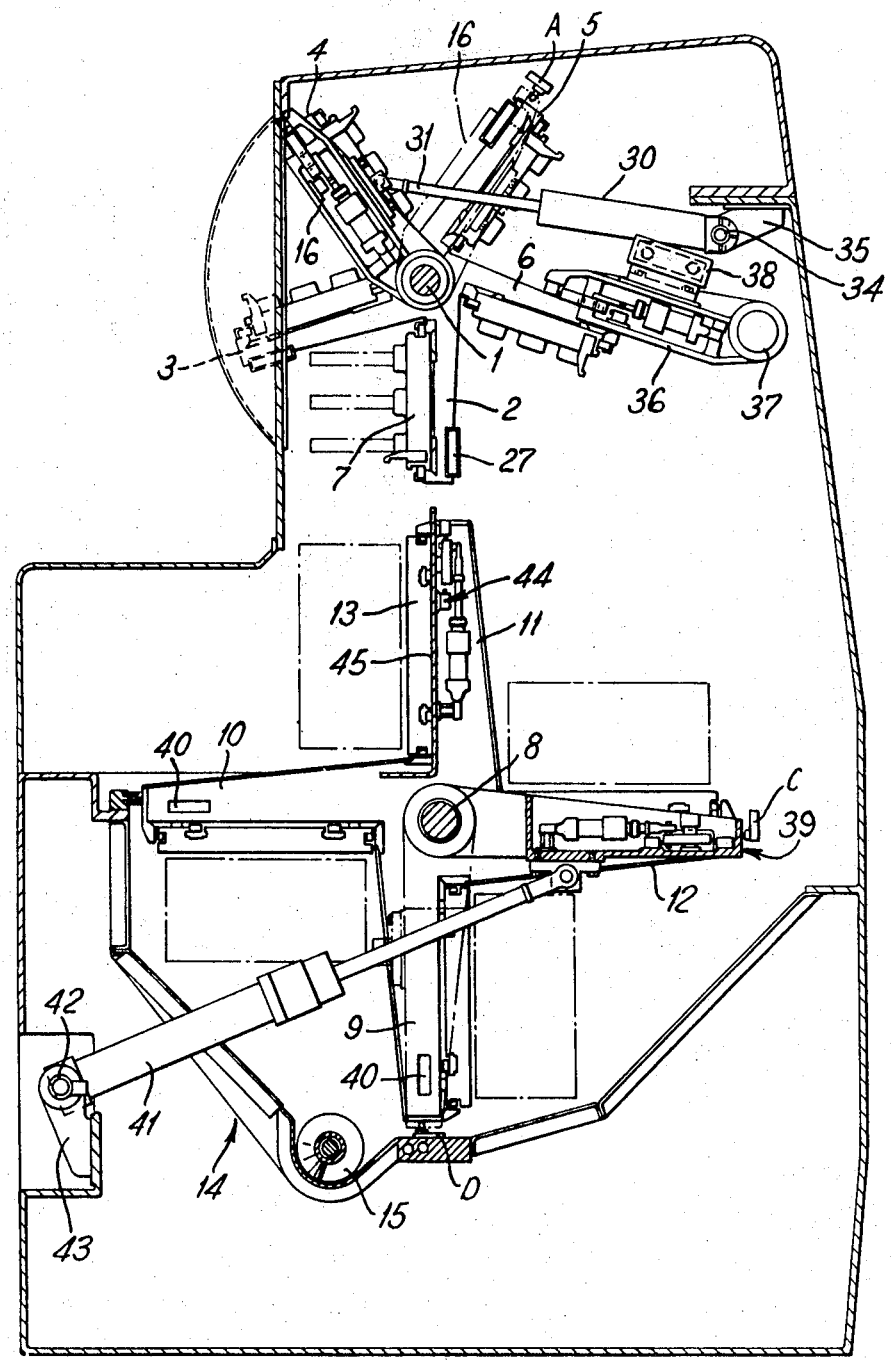

United States Patent

[11] 3,557,930

[72] Inventors David T. N. Williamson;
William Wood, London, England
[21] Appl. No. 769,146
[22] Filed Oct. 21, 1968
[45] Patented Jan. 26, 1971
[73] Assignee Molins Machine Company Limited
London, England
a corporation of Great Britain
[32] Priority Oct. 25, 1967
[33] Great Britain
[31] 48,625

[54] MECHANISM FOR EFFECTING INTERMITTENT ROTATION
4 Claims, 3 Drawing Figs.

[52] U.S. Cl............................................. 198/19,
198/211
[51] Int. Cl...................................................... B23q 5/22,
B65g 29/00
[50] Field of Search........................................ 198/211,
135, 19; 269/63, 69(Inquired); 74/813,
817(inquired)

[56] References Cited
UNITED STATES PATENTS
1,567,153 12/1925 Kelly............................ 198/211X
3,263,316 8/1966 Schrader...................... 198/211X Primary Examiner—Edward A. Sroka
Attorney—Emory L. Groff & Emory L. Groff, Jr.

ABSTRACT: Mechanism for rotating in steps a member having a number of equally-spaced radial paddles. The paddles may be used in a machine tool to carry palleted workpieces or tool magazines for loading into the machine tool.

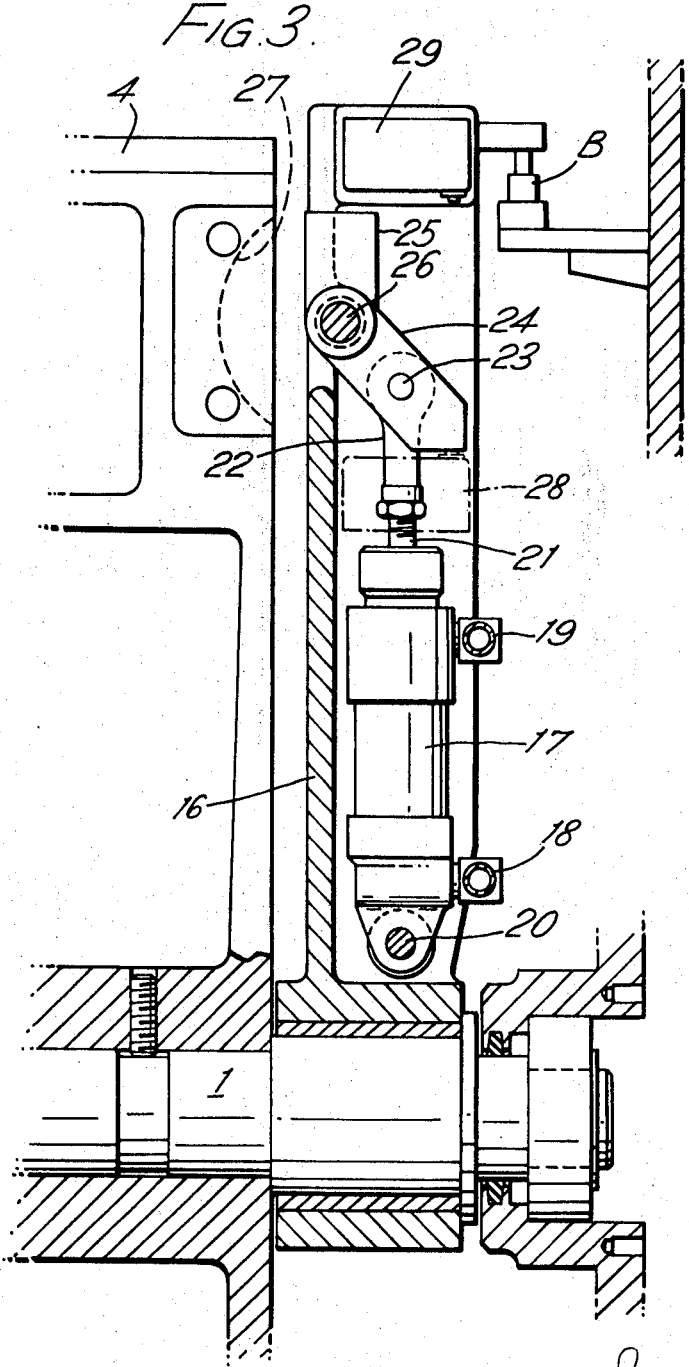

MECHANISM FOR EFFECTING INTERMITTENT ROTATION

This invention relates to improvements in mechanism for effecting intermittent rotation, and more particularly to a loading unit for a machine tool using such mechanism.

In British Pat. application No. 21106/67 there is disclosed a loading unit for a numerically controlled machine tool, the loading unit comprising an upper rotatable member with paddles each adapted to carry a tool magazine and a lower rotatable member with paddles each adapted to carry a pair of pallets loaded with workpieces. The members are rotated intermittently by means of a hydraulic motor and stopping mechanism by which a selected paddle can be stopped at a position where a tool magazine or a pair of pallets, respectively, can be fed from the paddle into the machine tool or received on the paddle from the machine tool. In the case of the upper member the stopping mechanism comprises a boss rotatable with the member and having peripheral slots adapted to receive a rod which is moved into a slot to hold the member stationary. In the case of the lower member the stopping mechanism comprises a roller mounted on each paddle and a hook which engages with the roller to hold the member stationary.

According to the present invention there is provided mechanism for effecting intermittent equiangular rotation of a rotatable member having a plurality of equiangularly spaced paddles, the mechanism comprising a movable element having associated first paddle engaging means adapted to engage with, and disengage from, a paddle, means to operate the first paddle engaging means to engage with a paddle when the latter is at a first position and to disengage from the paddle when the latter is at a second position angularly spaced from the first position, and driving means, such as a hydraulic jack, effective to move the element so that a paddle at the first position and engaged by the first paddle engaging means is rotated by the element to the second position and, after disengagement from the paddle of the first paddle engaging means when the paddle is at the second position, to return the element for engagement with a further paddle at the first position by the first paddle engaging means. The mechanism preferably includes a stationary element having associated therewith second paddle engaging means adapted to engage with, and disengage from a paddle, and means to operate the second paddle engaging means so that a paddle is engaged and thereby held stationary while the movable element is returned from the second position to the first position, and is disengaged before movement of the movable element from the first position to the second position. The means to operate the paddle engaging means may comprise a hydraulic jack, and the paddle engaging means may comprise a part pivotable to project from its associated element to engage a paddle, for example to engage in a slot or recess provided in the paddle.

The present invention more particularly provides such mechanism in a machine tool loading unit comprising a rotatable member having a plurality of paddles each adapted to support an article, such as a pallet loaded with a workpiece or such as a tool magazine to be fed into the machine tool, the first and second positions being arranged so that when paddles are at these positions a paddle is located in alignment with an entry to the machine tool for the article carried on the paddle. The loading unit may comprise a first rotatable member having a plurality of paddles each adapted to carry a tool magazine, and a second rotatable member having a plurality of paddles each adapted to carry a pallet (e.g. adapted to carry a pair of pallets), mechanism for effecting intermittent rotation in accordance with the invention being provided for each of the first and second rotatable members.

Figure 2:
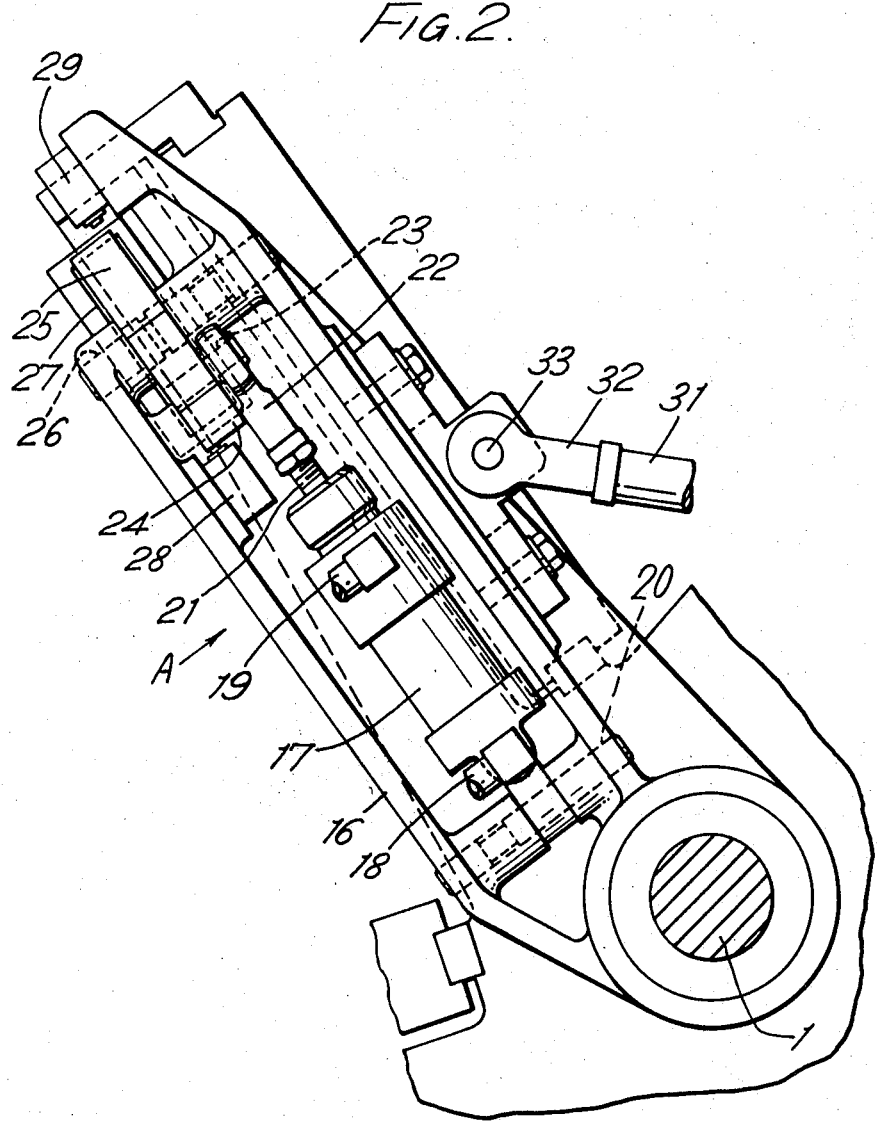

Mechanism in accordance with the invention will now be described by way of example, with reference to the accompanying drawings, in which:

FIG. 1 is an end elevation of a loading unit for a numerically controlled machine tool, FIG. 2 is a view to a larger scale of part of the mechanism shown in FIG. 1, and FIG. 3 is a sectional view as seen in the direction of arrow A in FIG. 2 through the mechanism shown in FIG. 2.

FIG. 1 shows a loading unit which is essentially similar to that described in the aforementioned application but having different mechanism for effecting intermittent rotation of members of the unit. The basic features of the loading unit will therefore only briefly be described herein and reference is directed to the aforementioned application for a more detailed explanation of their construction and operation.

The unit comprises an upper member rotatable on a shaft 1 and having five substantially radial paddles 2, 3, 4, 5 and 6 in equiangular spaced relationship. Each of these paddles is adapted to carry a tool magazine (one of which is indicated as 7). When a paddle is stationary at the lowermost vertical position shown occupied by the paddle 2 the tool magazine it carries can be fed into the machine tool, which can use the tools contained in the magazine for a machining operation, and, after the machining operation, the paddle can receive back the tool magazine from the machine tool. The member can then be rotated to position a different paddle at the lower vertical position so that a different selected tool magazine can be fed into the machine tool. The tool magazine on a particular paddle can also be changed when the paddle is at the lower vertical position, i.e. the magazine carried by the paddle can be removed therefrom and replaced by a different magazine, for example by means of an automatic transporter as described in U.S. Pat. application Ser. No. 636,993.

The loading unit further comprises a lower member rotatable on a shaft 8 and having four substantially radial paddles 9, 10, 11 and 12 in equiangular spaced relationship. Each of these paddles is adapted to carry a pair of pallets loaded with workpieces (one pallet being indicated as 13). When a paddle is stationary at the uppermost vertical position, shown occupied by the paddle 11, the pair of pallets it carries can be fed into the machine tool for machining of the workpieces loaded on the pallets (the machine tool being a twin-spindle machine capable of machining the workpieces on both pallets simultaneously), and, after the machining operation, the paddle can receive back the pallets from the machine tool. The member can then be rotated to position a different paddle at the upper vertical position so that the pallets on the different paddle can be fed into the machine tool. Pallets can be removed from a paddle when it is at the right-hand horizontal position, as viewed in FIG. 1, shown occupied by the paddle 12, and further pallets can be received on the paddle at this position, for example by means of an automatic transporter as described in the second mentioned application. Extending between the positions shown occupied by the paddles 9 and 10 are guards and cleaning means, generally indicated by the reference 14, which act, by the use of air jets and sealing brushes, to remove swarf and foreign matter from the pallets workpieces and paddles as they pass between these positions, matter so removed falling into the range of action of an Archimedean screw 15 which feeds it away for disposal.

Referring now to the upper, tool magazine carrying member, rotation of the member is effected by mechanism as follows. An element 16, shown in greater detail in FIGS. 2 and 3, is mounted on the shaft 1 adjacent the paddle member so as to be movable about the shaft 1 between the angular position shown occupied by the paddle 4 and that shown occupied by the paddle 5 (the element being shown in the latter position in broken line in FIG. 1). Associated with the element 16 is a pneumatic jack 17 having air inlet and outlet connections 18 and 19, and mounted on the element 16 by a pivot 20. The jack has a projecting piston rod 21 secured to a connector 22 which connects with a pivot 23 on an arm 24 having an integral paddle engaging finger 25. The arm 24 is mounted on the element 16 by a pivot 26 so that when the piston rod 21 is extended by the jack 17, i.e. is moved upwardly as viewed in FIG. 3, the arm 24 is moved about its pivot 26 causing the paddle engaging finger 25 to project from the element 16.

Each of the paddles 2 to 6 is provided with a slot or recess 27 in which the paddle engaging finger 25 can engage when it projects from the element 16 and the paddle is aligned with the element 16. Withdrawal of the piston rod 21 by the jack 17 moves the arm 24 about its pivot 26, disengaging the finger 25 from the slot 27 in the paddle and returning the arm 24 to its position shown in FIG. 3. The element 16 carries two electrical switches 28 and 29 one, 28, of which is held closed by the arm 24 when it is in its position shown in FIG. 3, i.e. when it is not engaging a paddle, and the other, 29, of which is held closed by the arm 24 when it is in its paddle engaging position.

Movement of the element 16 about the shaft 1 is effected (see FIGS. 1 and 2) by a hydraulic jack 30 having a projecting piston rod 31 whose end is secured to a connector 32. The connector 32 is connected to a pivot 33 provided on the element 16. The jack 30 is mounted by a pivot 34 on a stationary bracket 35 secured to a fixed part of the loading unit housing, the bracket being adjustable to permit correct positioning of the jack stroke. Withdrawal of the piston rod 31 by the jack 30, i.e. movement of the piston rod generally to the right as viewed in FIG. 1, moves the element 16 from its position (shown in full line in FIG. 1) in alignment with the paddle shown at 4 to its position (shown in broken line in FIG. 1) in alignment with the paddle shown at 5. Extension of the piston rod 31 by the jack 30 returns the element from the latter position to the former.

A stationary element 36, essentially similar to the element 16 and having the same paddle engaging and disengaging device operated by a pneumatic jack, is secured by a fixed mounting 37 and a fixed bracket 38 to the housing of the loading unit. The element 36 is positioned so that its paddle engaging device can engage a paddle at the position shown occupied by the paddle 6, i.e. so that a paddle engaging finger, like the finger 25, of an arm, like the arm 24, can engage in the slot 27 of a paddle at that position.

The operation of the mechanism for rotating the upper paddle member will now be described, commencing with the parts in their positions shown in FIG. 1 and with the paddle engaging device of the stationary element 36 in engagement with the paddle 6, and the paddle engaging device of the movable element 16 not in engagement with the paddle 4. The jack 30 is operated to withdraw the piston rod 31 and thereby moves the element 16 from its position aligned with the paddle 4 to its position aligned with the paddle 5, the paddles being held stationary due to the paddle 6 being engaged by the paddle engaging device of the stationary element 36. When the element 16 is aligned with the paddle 5 the jack 17 is operated to extend the piston rod 21, thereby causing the finger 25 to engage in the slot 27 of the paddle 5, and the jack on the stationary element 36 is operated to withdraw its piston rod, thereby withdrawing the paddle engaging finger on the element 36 from the slot 27 of the paddle 6. The jack 30 is then operated to extend its piston rod 31 and move the element 16 back to its former position, and, since the paddle engaging finger on the element 16 is in engagement with the paddle 5, the paddle 5 is moved with and by the element 16, the other paddles moving correspondingly; in other words the paddles are indexed one step forward in an anticlockwise direction as viewed in FIG. 1. After completion of such movement, the jack on the stationary element 36 is operated to move the paddle engaging finger on the element into engagement with the slot 27 in the paddle then at that position, namely the paddle 2, and the jack 17 on the element 16 is operated to disengage the finger 25 from the paddle 5. The element 16 is then ready to be moved by the jack 30 to effect another indexing step. In this manner, therefore, stepwise or intermittent rotation of the paddle member can be effected and by an appropriate number of indexing steps any of the paddles can be located at the lower vertical position (shown occupied by the paddle 2) for feeding of the magazine carried thereon into the machine tool, or for changing the tool magazine thereon.

Operation of the mechanism, i.e. operation of the pneumatic and the hydraulic jacks, may be under automatic control, for example when the loading unit is used in a machine tool system as described in the second-mentioned application. The switches 28 and 29 on the movable element 16, and corresponding switches on the stationary element 36, can serve to provide a signal indicative of whether or not the paddle engaging finger on the element is in its paddle engaging position. Such signals can be used to coordinate the operation of the parts. For example, closure of the switch 28, indicating that the finger 25 on the movable element 16 has disengaged the paddle with which the element is aligned, can actuate operation of the jack 30 to return the element 16 to its position aligned with the paddle shown as 5; closure of the switch 29, indicating that the finger 25 on the movable element 16 has engaged a paddle, can actuate operation of the jack on the stationary element 36 to disengage the finger on that element from the paddle with which it is aligned; closure of a switch on the stationary element 36 corresponding to the switch 28, indicating that the finger on that element has disengaged its aligned paddle, can actuate operation of the jack 30 to move the element 16, and the paddle engaged by its finger 25, one step forward; closure of a switch on the stationary element 36 corresponding to the switch 29, indicating that the finger on that element has engaged its aligned paddle, can actuate the jack 17 on the movable element 16 to disengage the finger 25 from the paddle aligned with the element 16. A further switch A (FIG. 1), operated by the element 16, is provided to indicate when the element 16 has reached its rear most position, i.e. the position aligned with the paddle shown as 5, and a similar switch B (FIG. 3), operated by a pin extending from the side of the element 16, is provided to indicate when the element 16 has reached its foremost position, i.e. the position aligned with the paddle shown as 4 in FIG. 1. By this arrangement, the paddle member can be caused to complete one indexing step by the application of a single signal effective to actuate operation of the jack 17 on the movable element 16 to cause the finger 25 to engage the paddle (at the position shown occupied by the paddle 5), and the indexing step will be completed automatically by virtue of the switching arrangement described above, leaving the element 16 at the starting position on completion of the step in readiness for a further step on application of a further such single signal.

It will be appreciated that between rotational steps the paddle member is held stationary by engagement of the finger on the stationary element 36 with the aligned paddle, and that the paddle member is so held stationary during the time that a tool magazine is fed from the lower vertical paddle into the machine tool. The paddle member may then remain stationary until the tool magazine is returned on to that paddle from the machine tool, or it may be rotated to position another paddle at the lower vertical position, so that the tool magazine on that other paddle can be changed, and then further rotated to return the first paddle to the lower vertical position for receipt of its magazine from the machine tool.

The lower, pallet carrying, paddle member is intermittently rotated by mechanism essentially similar to that described above in relation to the upper paddle member, and therefore requiring only a brief description. The mechanism comprises a movable element 39, essentially similar to the movable element 16, and movable about the shaft 8 between a position aligned with the paddle shown as 12 and a position aligned with the paddle shown as 9. The element 39 carries a pneumatic jack, like the jack 17, and a paddle engaging device operated thereby and having a finger, like the finger 25, which can project to engage in a slot 40, one of which is provided in each of the paddles 9, 10, 11 and 12. The element 39 is moved between the two positions by a hydraulic jack 41, like the jack 30, and mounted on a pivot 42 on a bracket 43 secured to the unit housing but adjustable to permit correct positioning of the jack stroke. A stationary element 44, essentially similar to the stationary element 36, and carrying a similar pneumatic jack and paddle engaging device operated thereby, is secured to a fixed part 45 of the unit housing at a position aligned with the upper vertical paddle position.

The operation is essentially the same as that described above with reference to the upper paddle member and will therefore only be described very briefly. Starting with the parts as shown in FIG. 1, and with the finger on the stationary element 44 in engagement with the slot 40 on the paddle 11 and the finger on the movable element 39 disengaged from the paddle 12, the jack 41 operates to move the element 39 down to the lower vertical position; the jack on the element 39 then operates to engage its finger in the slot 40 of the paddle 9 and the jack on the stationary element 44 operates to disengage its finger from the paddle 11; the jack 41 operates to move the element 39, and hence the paddle 9 engaged by its finger, back to its horizontal position, thus indexing all the paddles one step forward (anticlockwise as viewed in FIG. 1); the jack on the stationary element 44 operates to engage its finger in the paddle then at that position, namely the paddle 12, and the jack on the movable element 39 operates to disengage its finger from the paddle 9. In this manner successive indexing steps can be effected and, by an appropriate number of steps, any desired paddle can be moved to the upper vertical position for feeding of the pallets carried thereby into the machine tool, or to the right-hand horizontal position for removal of a pair of pallets from the paddle and replacement by a further pair. Between rotational steps the paddle member is held stationary through engagement of the finger on the stationary element 44 with the paddle at the upper vertical position, and is so held stationary while the pallets are fed from that paddle into the machine tool. While the workpieces on the pallets are being machined the paddle member can be rotated to move a paddle carrying pallets loaded with workpieces which have been machined through the cleaning station and to the right-hand horizontal position for removal of the pallets and replacement by a further pair of pallets loaded with workpieces to be machined. By this arrangement three of the paddles can simultaneously carry pallets loaded with workpieces to be machined, thereby providing a buffer store of work to be done at the machine tool. The paddle member is held stationary while a pair of pallets is removed from the paddle at the right-hand horizontal position and is replaced by a further pair of pallets, and the paddle member can then be rotated to return the empty paddle, whose pallets are in the machine tool, to the upper vertical position for receipt of the pallets from the machine tool after machining of the workpieces loaded thereon.

As described in relation to the upper paddle member, the operation may be under automatic control, and switches may be provided to coordinate operation of the parts, such switches including switches C and D (FIG. 1) respectively operated by the member 39 at its right-hand horizontal and lower vertical positions.

A brush (not shown in the drawings) may be mounted between the loading unit and the machine tool to clean the rear faces of the pallets as they are fed from a paddle at the upper vertical position (shown occupied by the paddle 11) into the machine tool, such brush protruding slightly in front of the paddle face at that position and the part of the machine tool which receives the pallets. Similar brushes may be provided to clean the lower edge of a tool magazine and the upper edges of pallets being returned from the machine tool onto their respective paddles. These latter brushes can serve, in particular, to clean a part of the pallet or tool magazine bearing an identifying binary number which is read by a read-head in the loading unit as described in the first mentioned application.

We claim:

1. Mechanism for effecting intermittent equiangular rotation of a rotatable member having a plurality of equiangularly spaced paddles, the mechanism comprising; a movable element including first paddle engaging means to engage with, and disengage from, a paddle, means to operate said first paddle engaging means to engage with a paddle when the latter is at a first position, and to disengage from the paddle when the latter is at a second position angularly spaced from the first position, driving means to move said movable element so that a paddle at said first position and engaged by said first paddle engaging means is rotated by said element to said second position and, after disengagement from the paddle of the first paddle engaging means when the paddle is at the second position, to return said element for engagement with a further paddle at said first position by the first paddle engaging means, and further comprising a stationary element including second paddle engaging means adapted to engage with, and disengage from, a paddle, and means to operate the second paddle engaging means so that a paddle is engaged and thereby held stationary while said movable element is returned from said second position to said first position, and is disengaged before movement of said movable element from said first position to said second position, the first and second paddle engaging means each including a part pivotable to project from its associated element to engage in a recess in a paddle.

2. Mechanism as claimed in claim 1 wherein the means to operate each paddle engaging means comprises a pneumatic jack.

3. Mechanism as claimed in claim 1 wherein the means to move said movable element is a hydraulic jack.

4. A machine tool loading unit comprising two rotatable members each having a plurality of equiangularly spaced paddles, the paddles of one rotatable member being each for supporting a tool magazine removed from, or to be fed into, an associated machine tool, the paddles of the other rotatable member being each for supporting a pallet loaded with a workpiece removed from, or to be fed into, the associated machine tool, and a mechanism for effecting intermittent equiangular rotation of each rotatable member, each mechanism comprising a movable element having first paddle engaging means to engage with, and disengage from, a paddle, means to operate said first paddle engaging means to engage with a paddle when the latter is at a first position, and to disengage from the paddle when the latter is at a second position angularly spaced from the first position, and driving means to move said movable element so that a paddle at said first position and engage by said first paddle engaging means is rotated by said element to said second position and, after disengagement from the paddle of the first paddle engaging means when the paddle is at the second position, to return said element for engagement with a further paddle at said first position by the first paddle engaging means, said first and second paddle engaging means being arranged so that when paddles are at these positions a paddle is located in alignment with an entry to the machine tool for the article carried on the paddle.